United States Patent [19]

Schnall et al.

[11] 4,249,574
[45] Feb. 10, 1981

[54] ORIFICE TRIM AND BACKPRESSURE PLATE FOR HIGH PRESSURE VALVES

[75] Inventors: Ira H. Schnall, Erie, Pa.; Walter W. Mott, Sandway, Nr. Northwich, England

[73] Assignee: Copes-Vulcan, Lake City, Pa.

[21] Appl. No.: 884,913

[22] Filed: Mar. 9, 1978

[51] Int. Cl.³ ............................................. F16K 47/14
[52] U.S. Cl. .................. 137/625.3; 251/127; 137/625.37; 138/42; 138/43
[58] Field of Search .......... 137/625.3, 625.37, 625.38; 251/127; 138/42, 43

[56] References Cited

U.S. PATENT DOCUMENTS

| | | | |
|---|---|---|---|
| 3,513,864 | 5/1970 | Self | 137/625.3 X |
| 3,514,074 | 5/1970 | Self | 251/127 |
| 3,529,628 | 9/1970 | Cummins | 137/625.3 |
| 3,722,854 | 3/1973 | Parola | 251/127 |
| 3,813,079 | 5/1974 | Baumann | 251/127 |
| 3,856,049 | 12/1974 | Scull | 251/127 X |
| 3,880,399 | 4/1975 | Luthe | 137/625.37 X |
| 3,908,698 | 9/1975 | Baumann | 137/625.3 |
| 3,917,221 | 11/1975 | Kubota et al. | 251/127 |
| 3,921,668 | 11/1975 | Self | 137/625.3 |
| 3,954,124 | 5/1976 | Self | 137/625.3 X |
| 3,990,475 | 11/1976 | Myers | 137/625.3 |
| 4,024,891 | 5/1977 | Engel et al. | 138/42 X |
| 4,109,683 | 8/1978 | Strache | 137/625.3 |

FOREIGN PATENT DOCUMENTS

| | | |
|---|---|---|
| 2351715 | 4/1975 | Fed. Rep. of Germany ............ 251/127 |
| 2514879 | 10/1976 | Fed. Rep. of Germany ......... 137/625.3 |
| 131774 | 7/1978 | Fed. Rep. of Germany ......... 137/625.3 |
| 946230 | 12/1971 | Italy . |
| 338210 | 11/1930 | United Kingdom . |
| 506292 | 5/1939 | United Kingdom . |
| 933234 | 8/1963 | United Kingdom . |
| 1259805 | 1/1972 | United Kingdom . |
| 1408598 | 1/1975 | United Kingdom . |
| 1485909 | 9/1977 | United Kingdom . |

*Primary Examiner*—Arnold Rosenthal
*Attorney, Agent, or Firm*—Mandeville and Schweitzer

[57] ABSTRACT

A new and improved fluid restrictor means for use in a valve structure, as a backpressure plate, or the like and generally comprising a plurality of close-fitting mating cylindrical parts each of said parts including a plurality of openings spaced across the surface thereof. The mating parts are rigid in construction and arranged and configured whereby they are in a contacting relationship and the openings of contiguous mating parts are in an overlapping relation to form restricting orifices for flow communication between complementary openings. The volume of each of the openings is sufficient to form an expansion chamber for high pressure fluid flowing thrugh the restrictor means. The disclosed fluid restrictor means provides a structure which is easily arranged according to precise engineering specifications for a particular application. For example, all of the dimensions for the expansion chambers and restricting orifices are determined by the size of the openings in the mating parts, the thickness of the parts and the relative positions of the mating parts when in the final assembled form. These factors are determinable with great mathematical exactness and the present invention permits a highly precise implementation of the predetermined flow path characteristics into the structure of the disclosed fluid flow restrictor means.

2 Claims, 8 Drawing Figures

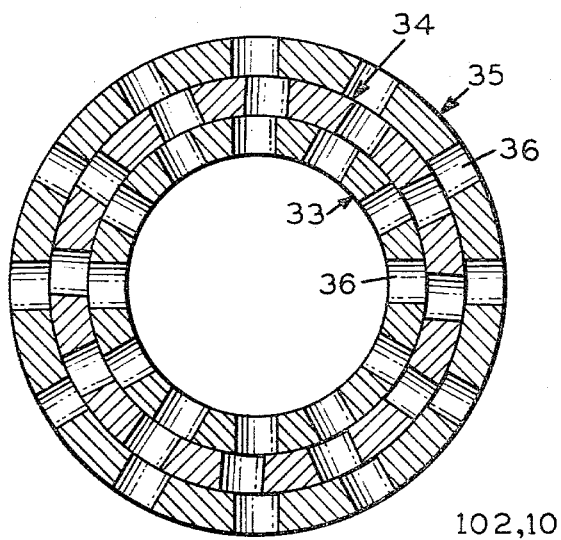
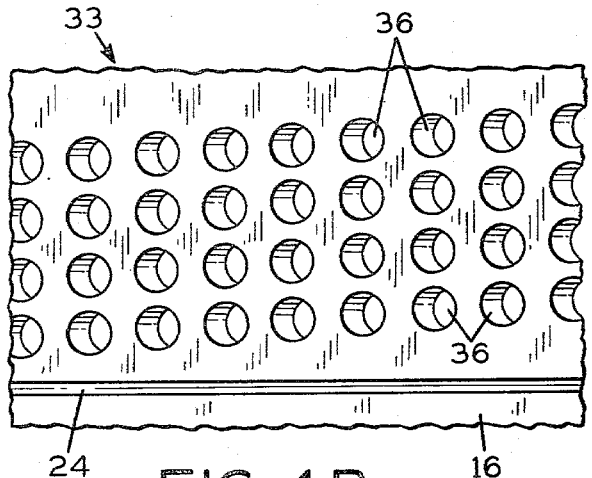
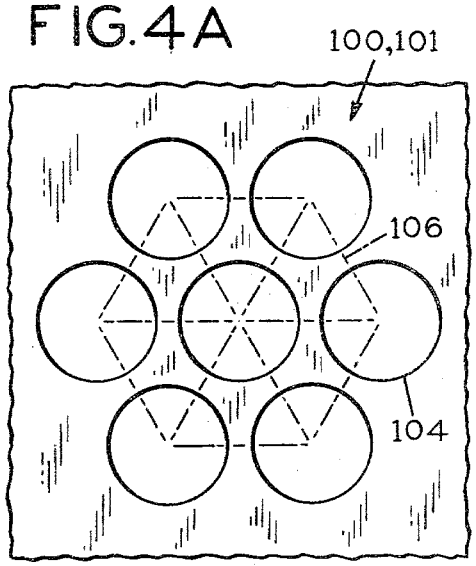
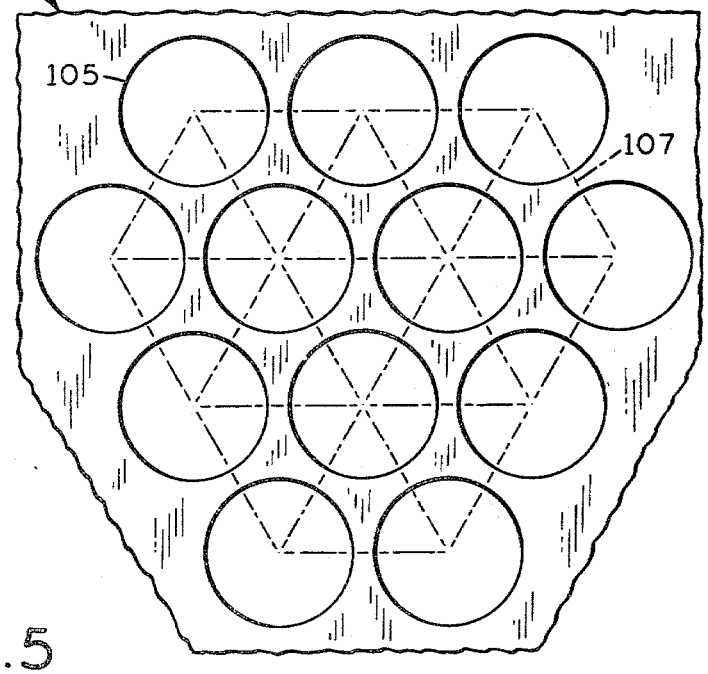
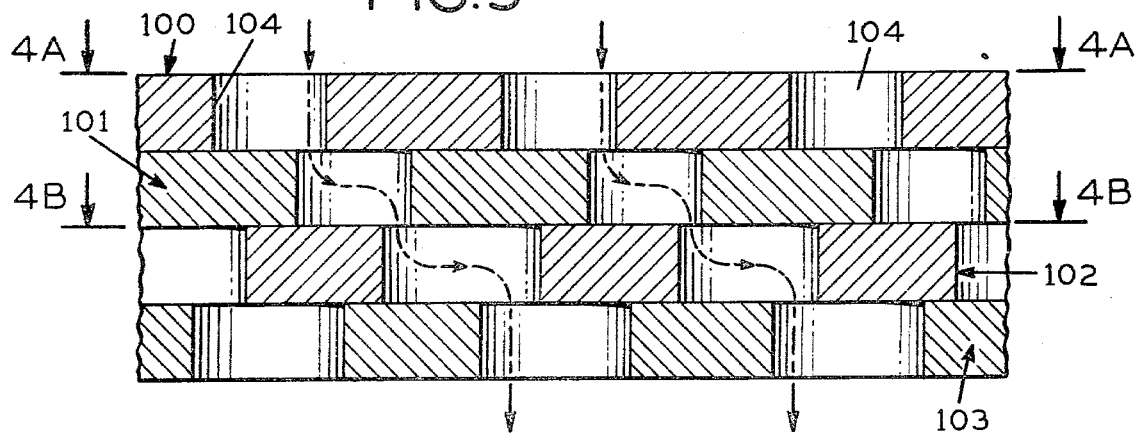

ORIFICE TRIM AND BACKPRESSURE PLATE FOR HIGH PRESSURE VALVES

BACKGROUND AND SUMMARY OF THE INVENTION

The present invention relates to a quiet valve or the like, and more particularly to a novel and improved arrangement for a series of orifices and expansion chambers in a fluid flow restrictor means to achieve an orderly and silent dissipation of fluid energy in a throttling process.

Fluid flowing at high velocities and under high pressure through a valve may cause objectionable noise problems and subject the valve structure to severe cavitation. These problems are caused primarily by a sudden drop in the pressure as the fluid flows through the valve. Accordingly, many prior art devices have been proposed for utilizing a fluid flow restrictor means arranged intermediate the inlet and outlet of the valve to effect a controlled, multiple stage dissipation of the fluid energy. Typically, the fluid is caused to flow through labyrinthine paths or through a series of orifices and expansion chambers resulting in the gradual dissipation of energy either through multiple changes of direction, controlled and limited expansion, friction or a combination of these.

Representative of prior art valve constructions are the Parola U.S. Pat. No. 3,722,854, and the Kubota et al. U.S. Pat. No. 3,917,221. Each of these patents discloses a high pressure drop restrictor means wherein the fluid is passed through a multiplicity of expansion chambers and restricting orifices arranged in a series to effect an energy dissipation in multiple stages. The pressure drop at each stage is kept sufficiently low to avoid cavitation and the generation of excessive noise. Although the prior art proposals have been effective in greatly reducing the noise and cavitation problems, they have not been entirely satisfactory in that they comprise structures which are costly to manufacture, difficult to arrange according to precise engineering specifications, or both. Consequently, the prior art lacks a fluid flow restrictor which is conveniently adaptable to the exact requirements of a particular application, yet is capable of economical production.

It is a primary objective of the present invention to provide a novel and improved fluid flow restrictor for a high energy fluid valve or the like which is convenient and economical to manufacture and which is capable of achieving highly advantageous geometric relationships of orifice sizes and expansion chamber volumes. Generally, the invention comprises a flow restrictor means wherein a series of expansion chambers and orifices are formed by overlapping openings of close-fitting mating rigid parts. The openings are conveniently drilled in the mating parts and the parts are arranged in a contacting relationship relative to one another to achieve a predetermined overlapping relationship between the openings of contiguous parts. Each opening is uniform throughout the thickness of the individual part. The openings may be formed in any predetermined array over the surface of each of the mating parts and the mating relationship between the parts may be established to provide an overlap of predetermined dimensions between complementary openings. In this manner, the individual openings form expansion chambers, the volume of which is determined by the diameter of the opening and the thickness of the part. In a preferred arrangement, the thickness of the part is in the order of ½ to 1 times the dimension of the opening diameter. The restricting orifices for fluid communication between the expansion chambers are formed by the circular arcs of the overlapping openings. The dimensions of each orifice are determined by the opening size and the amount of overlap. Accordingly, the disclosed structure provides a novel flow restrictor which may be easily arranged according to precise engineering specifications for a particular application. All of the critical dimensions for the expansion chambers and orifices are determined by the size of the openings, part thickness and relative positions of the mating parts. These factors may be determined with great mathematical exactness and easily implemented into the structure of the present invention. Moreover, any number of mating parts may be arranged in series to provide any desired number of expansion chambers and orifices.

In accordance with a specific aspect of the present invention, the mating parts comprise close-fitting concentric cylinders arranged within a valve body between the inlet and outlet passages of the valve. A series of openings are formed in a desired pattern over the surface of each cylinder and the cylinders are shifted, one relative to the other to provide a predetermined overlapping relationship between the openings. Likewise, the opening sizes and cylinder thickness may be of any predetermined dimensions.

In one advantageous form of the invention, an axially movable valve plug is received within the interior of the innermost cylinder and is operable through a limited stroke to uncover the openings in a progressive manner to permit fluid flow. The openings may be aligned about a given point to form orifices of uniform dimensions or they may be arranged to form larger orifices in conjunction with increasing valve stroke, to provide a non-linear valve characteristic. In a preferred form of the invention, the openings are arranged in a helical pattern about the cylinder wall. As the valve plug is retracted to open the valve, several of the openings will be at various stages of being opened at any point in the stroke. This will afford a smooth, stepless flow characteristic in the opening of the valve.

In accordance with another specific aspect of the invention, the teachings of the present disclosure may be applied for use as a backpressure plate, for example, in a desuperheater outlet. In this embodiment, the openings are arranged at the vertices of equilateral triangles of predetermined dimensions across the surface of a plate, whereby the openings in successive close-fitting plates may intersect either one, two or three openings in a contiguous plate. This arrangement allows a high degree of mixing of the fluid which is desireable in a high pressure outlet.

For a better understanding of the above and other features and advantages of the invention, reference should be made to the following detailed description of preferred embodiments and to the accompanying drawings.

DESCRIPTION OF THE DRAWINGS

FIG. 2 is a cross-sectional view of the valve taken generally along line 2—2 of FIG. 1.

FIG. 3 is a partial developed view of a cylinder used in the flow restrictor of the valve of FIG. 1 and incorporating a helical pattern for the openings.

FIGS. 4A and 4B diagramatically illustrate opening patterns adapted particularly to be utilized in a backpressure plate constructed in accordance with the principles of the invention.

FIG. 5 is a cross-sectional view of a backpressure plate constructed in accordance with the principles reflected in FIGS. 4A and 4B.

DETAILED DESCRIPTION OF PREFERRED EMBODIMENTS OF THE INVENTION

Figure 1:
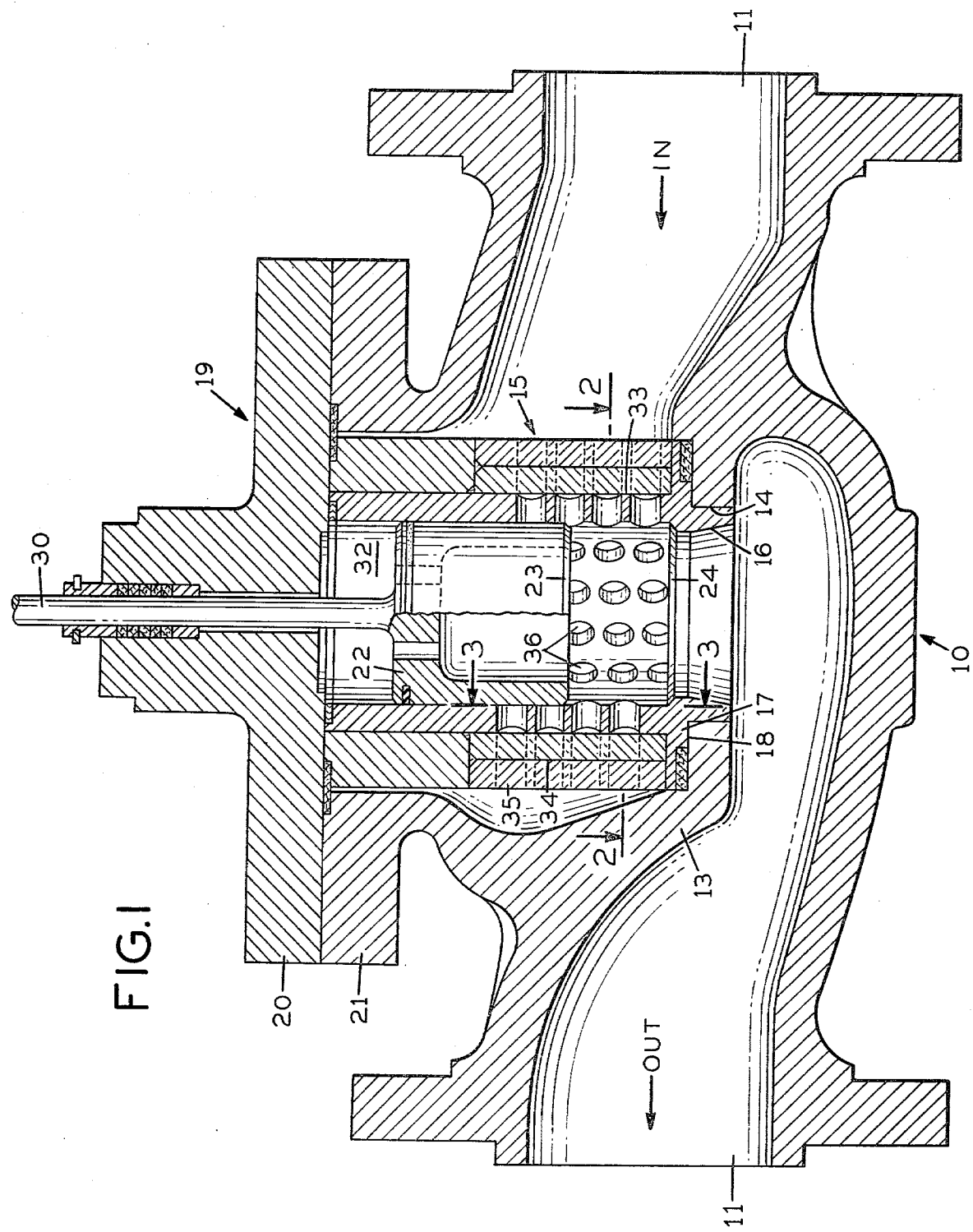
FIG. 1 is a longitudinal cross-sectional view of a high pressure valve incorporating an orifice trim constructed in accordance with the principles of the invention.

Referring now to the drawings and initially to FIG. 1 thereof, the reference numeral 10 designates generally a valve body of a fluid control valve, such as may be used in controlling the flow of water under high pressure, for example, as in a boiler feed system. The valve has an inlet passage 11 and an outlet passage 12. Intermediate the inlet and outlet passages 11, 12 is an internal web 13 provided with an opening 14 forming a valve passage and mounting the primary valve parts.

Seated within the web passage 14 is a generally cylindrical fluid flow restricting trim cage 15 having an extension 16 of reduced diameter extending into the web opening 14 and a shoulder 17 seated in a sealed relation against a corresponding shoulder 18 formed on the dividing web 13. A bonnet 19 is secured to the valve body 10 by flanges 20, 21, which may be bolted together in a conventional manner. The trim cage 15, web 13, and bonnet 19 form a sealed assembly, such that fluid flowing from the inlet passage 11 to the outlet passage 12 is required to flow in a controlled manner through the trim cage 15, as will be described in detail hereafter.

A valve plug 22 is slidably received within the trim cage 15 for controlled vertical movement. The lower end of the valve plug 22, adjacent its side wall, is provided with a tapered, annular valve surface 23 arranged for cooperation with a similarly tapered annular valve seat 24 in the lower portion of the trim cage 15. When the valve plug 22 is in its lowermost position, the surface 23 mates with the valve seat 24 to completely close the valve. As the valve plug 22 is progressively raised within the trim cage, an increasingly greater portion of the trim cage 15 is exposed to the fluid flow through the valve. In the illustrated embodiment, vertical movement of the valve plug 22 is controlled by a valve stem 30, which extends up through the bonnet 19 and is connected to a suitable actuator (not shown) such as a threaded hand wheel.

In accordance with the invention, the trim cage 15 comprises a plurality of close-fitting concentric cylinders 33, 34, 35. Each of the cylinders 33, 34, 35 is provided with a plurality of radial holes 36 each of uniform dimensions throughout the thickness of the part and spaced across the surface thereof. To advantage, the holes 36 may be conveniently drilled through the cylinders 33, 34, 35 after they have been arranged in a concentric, contacting relation to afford an economical manufacturing process. Moreover, the holes 36 may be spaced across the cylinder surfaces in any desired pattern. The fluid flowing from the inlet passage 11 to the outlet passage 12 is required to flow through the holes 36 in a manner to achieve an orderly dissipation of fluid energy, as will be described hereinafter.

In a preferred form, the holes 36 are arranged in a slightly helical array, as is clearly illustrated in FIG. 3. In this manner, as the valve plug 22 is progressively raised vertically to open the valve, the holes 36 of the innermost cylinder 33, adjacent horizontal the lower end of the plug 22, will be progressively opened in accordance with their position on the helical array. Accordingly, the valve may be opened with a smooth, stepless control since there is no "dead" travel between rows of holes 36.

Referring now to FIG. 2, it can be seen that after the holes 36 are formed in the concentric cylinders 33, 34, 35, the cylinders are rotated, one relative to the other, whereby the holes 36 of adjacent cylinders communicate in an overlapping relation. The amount of overlap may be arranged in accordance with the requirements of a particular application, and the cylinders may be displaced with great accuracy to achieve the predetermined overlapping relation. After the cylinders have been shifted to provide the overlap, they are securely fastened together, as for example by welding.

It can be readily appreciated, that the above-described concentric cylinder arrangement provides a plurality of labyrinthine fluid flow paths from the outside to the inside of the cylinders. Significantly, the thickness of each cylinder 33, 34, 35 and the diameter of the holes 36 may be selected whereby each for the fluid. In addition, the overlap between holes 36 forms a restricting orifice for fluid communication between the expansion chambers. Accordingly, as the fluid flows through the trim cage 15, the fluid will pass through a series of expansion stages as it flows through the holes 36 and overlaps. This will result in a controlled, gradual dissipation of fluid energy to obviate cavitation and noise problems.

Figure 6:
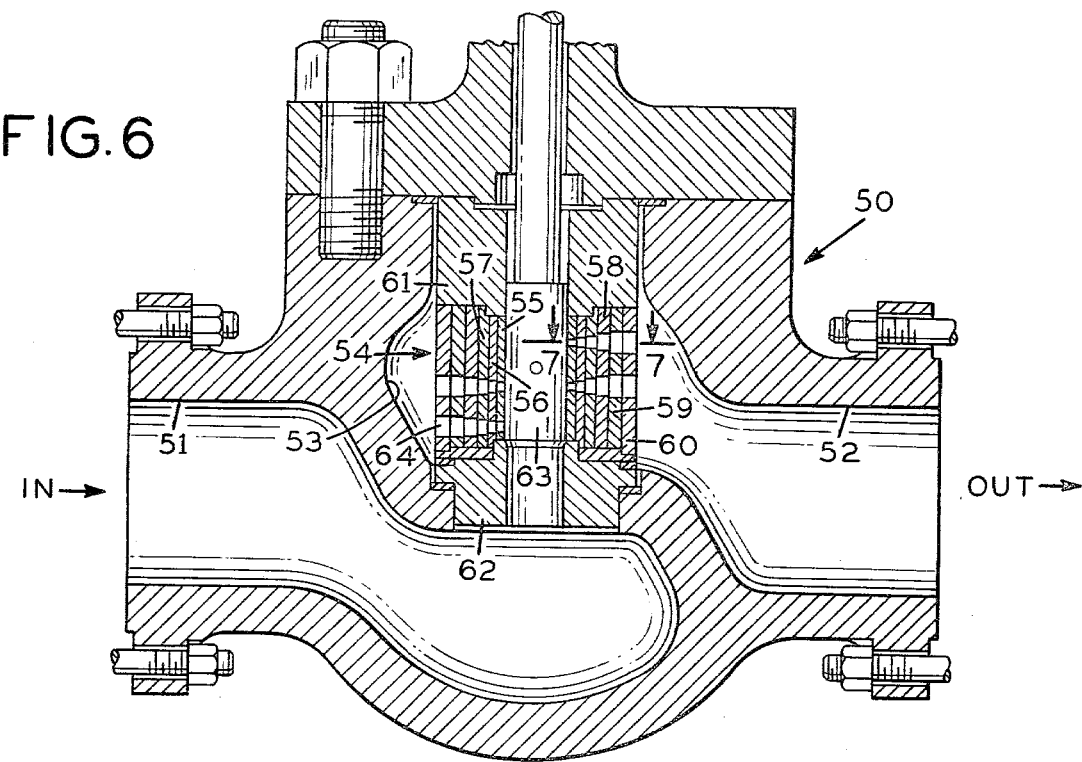
FIG. 6 is a longitudinal cross-sectional view of a high pressure steam valve incorporating an orifice trim constructed in accordance with a specific example of a practical application of the invention.
Figure 7:
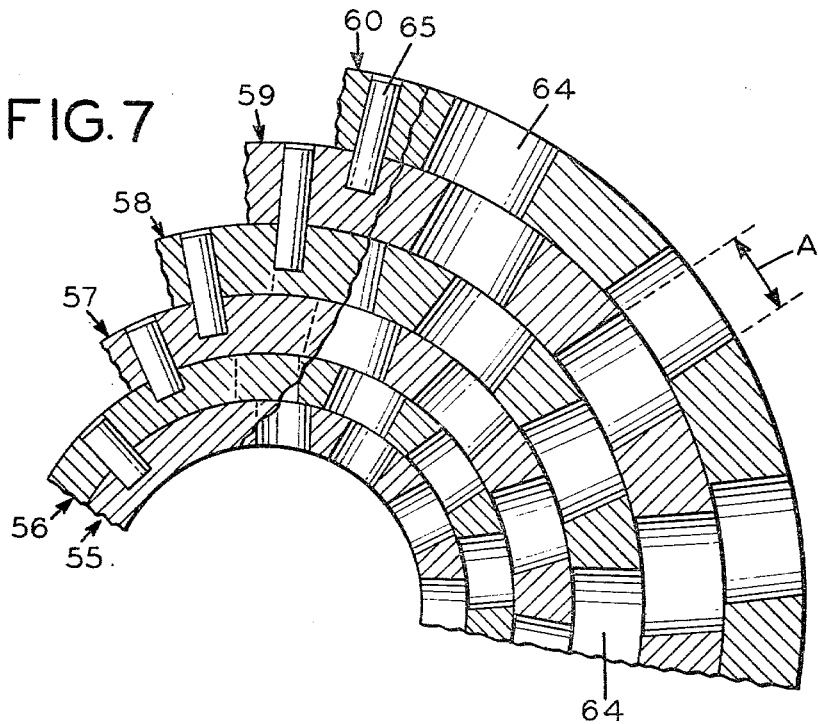
FIG. 7 is a partial cross-sectional view of the valve taken generally along line 7—7 of FIG. 6.

A representative example of a specific practical application for a valve built in accordance with the present invention is illustrated in FIGS. 6 and 7. A four inch valve 50 includes an inlet passage 51, outlet passage 52 and internal web 53 and is arranged to control a flow of steam at a maximum rate of 100,000 pounds per hour. The steam is at an input pressure to the valve of 2650 psia and temperature of 1050° F. with an output pressure of 150 psia. An orifice trim 54 consists of six concentric cylinders 55, 56, 57, 58, 59, 60 and is seated within the web 53 of the valve 50 between a balancing cylinder 61 and seat ring 62. A valve plug 63 is arranged for axial movement within the hollow interior of the innermost cylinder 55 of the valve trim 54, as in the embodiment of FIGS. 1–3.

Each of the cylinders 55–60 is provided with a plurality of holes 64 arranged as follows. The surface of each cylinder is divided into 25 longitudinal columns, each 14.4° apart. Two holes are drilled on each column for a total of 50 holes per cylinder with the holes of each column being offset in the longitudinal direction from the holes of an adjacent column whereby adjacent holes in the circumferential direction are spaced 28.8° apart. The center point of adjacent holes in the circumferential direction are in an angular relation with respect to a reference line parallel to the bottom line of the cylinder to provide a helical pattern for the holes. The following chart relates the specific dimensions, in inches, for the cylinders:

| Cylinder | Inner Dia. | Outer Dia. | Hole Dia. | Angle* |
|---|---|---|---|---|
| 55 | 1.345 | 1.748 | 0.25 | 5.719° |
| 56 | 1.750 | 2.123 | 0.31 | 4.714° |
| 57 | 2.125 | 2.623 | 0.38 | 3.816° |
| 58 | 2.625 | 3.248 | 0.44 | 3.085° |
| 59 | 3.250 | 3.936 | 0.50 | 3.547° |
| 60 | 3.938 | 4.630 | 0.50 | 2.168° |

*Angle refers to angle between center point of adjacent holes in circumferential direction, as discussed above.

Referring now to FIG. 7, the cylinders 55-60 are rotated relative to one another such that the overlap dimension A for holes 64 of contiguous cylinders 55-60 has the following valves, in inches:

| Cylinders | Overlap Distance |
|---|---|
| 55-56 | 0.148 |
| 56-57 | 0.181 |
| 57-58 | 0.225 |
| 58-59 | 0.283 |
| 59-60 | 0.367 |

In the embodiment of FIGS. 6 and 7, the cylinders 55-60 are fastened together by means of pins 65 interconnecting contiguous cylinders.

A valve constructed in accordance with the above dimensions is ideally suited for a particular steam operation. The specific dimensions may of course be varied according to any other practical application. Moreover, the hole size may be kept uniform through out the trim cage or it may be varied within each cylinder or from cylinder to cylinder. For example, the hole diameter may be larger for holes in the upper portions of the cylinder than in the lower portions to achieve a non-linear flow characteristic as the valve plug is raised to open the valve. In addition, the cylinder thickness and/or hole diameter may be progressively greater from the downstream cylinder to the upstream cylinder, as in the embodiment of FIGS. 6 and 7, to provide larger expansion chambers as the fluid flows through the trim cage. This last arrangement is especially suitable when a compressible fluid is flowing through the valve.

As a significant feature of the present invention, the various hole configurations, dimensions and overlap relationships may be precisely determined for a particular practical application. The trim cage may then be accurately and easily manufactured in accordance with precise specifications. The trim cage is most conveniently made by simple drilling operations to form the holes in all cylinders in a single step. Predetermined rotation of the mating cylinders determines the proper overlaps, and a welding operations fastens the cylinders together.

Referring now to FIGS. 4A and 4B and FIG. 5, there is illustrated a backpressure plate built in accordance with the teachings of the present disclosure. A plurality of plates 100, 101, 102, 103 are arranged in a close-fitting relation to one another and mounted across a fluid flow path, as for example in a desuperheater outlet, in a well known manner. The plates 100, 101 are each provided with a plurality of holes 104 and the plates 102, 103 with a plurality of holes 105 spaced across the surfaces thereof in a predetermined geometric pattern, as follows: The holes 104 of plates 100, 101 are arranged whereby the center point of each hole 104 is at one of the vertices of one of the equilateral triangles 106. Similarly, the holes 105 of plates 102, 103 are arranged such that each centerpoint thereof lies at one of the vertices of one of the equilateral triangles 107.

The sets of equilateral triangles 105, 106 are arranged on their respective plates 100, 101, 102, 103 whereby they are offset from one another when the plates are in a mating relationship to permit the holes 104, 105 of each plate to overlap one, two or three holes in an adjacent plate. In a preferred form for compressible fluid service, the holes 104 of plates 100, 101 are of smaller diameter than the holes 105 to provide for expansion of the fluid in accordance with reduction in fluid pressure toward the outlet of the flow restricting plates.

As in the embodiment of FIGS. 1-3, the hole diameter and plate thickness are chosen to be of sufficient dimension to permit each of the holes 104, 105 to act as an expansion chamber. Likewise, the overlaps form restricting orifices between the expansion chambers of contiguous plates. Accordingly, the backpressure plate provides a series of alternating expansion chambers and restricting orifices, for reducing the pressure of the flowing fluid in an orderly and controlled manner. Moreover, by having each hole overlap several other holes there will be a considerable dividing and recombining of the fluid stream to effect a better mixing of the fluid. To advantage, the teachings of the present invention, when applied as described above, may be utilized to design a backpressure plate of extremely precise fluid flow path configurations and dimensions.

The backpressure plate of the present invention can be produced by simplified and inexpensive manufacturing processes. A straightforward drilling operation is performed with the several plates 100-103 stacked together to form the holes 104, 105 in all of the plates. Thereafter, the plates are shifted relative to one another in accordance with a predetermined overlap relationship and fastened to one another to form the completed backpressure plate.

In its many embodiments, the present invention provides an extremely advantageous fluid flow restrictor means. The disclosed structure is capable of being engineered to the exact requirements of the application. At the same time, the valve trim or backpressure plate is of a rigid heavy duty construction to withstand the effects of high pressure and highly turbulent fluid flow. Inherent in the structure is a highly economical and convenient method for manufacturing the series of orifices and expansion chambers. Each opening and overlap relationship is precisely arranged according to the requirements of the application. Moreover, the geometric relationship of the holes of each mating part and of contiguous mating parts may be precisely arranged according to predetermined patterns to achieve highly desirable fluid flow characteristics. For example, the helical pattern for the orifice trim permits a smooth stepless control for opening a high pressure valve. The improved fluid flow restrictor means of the present invention provides a highly efficient and controlled energy dissipation for high pressure fluid.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. In a passage-forming means for high pressure fluid flow, means to provide a controlled, gradual dissipation of fluid energy comprising
    (a) a plurality of contacting, rigid mating parts arranged across the flow path of said passage-forming means, and
    (b) fluid flow openings formed through and spaced across each of said parts to define flow through spaces for the fluid,
    (c) each of said openings including width and length dimensions of predetermined value such that each of said fluid flow openings acts as an expansion chamber for the fluid flowing therethrough,
    (d) each of the fluid flow openings of each of the mating parts being of uniform dimensions throughout the thickness of the part,
    (e) the centerpoint of each of the fluid flow openings lying at the vertex of an imaginary equilateral triangle with the centerpoints of two adjacent fluid flow openings being arranged at the other vertices of said equilateral triangle, whereby each opening overlaps three openings of a contiguous part to provide a continuous dividing of the fluid flow as it flows from each opening to the three openings of the contiguous part which are in an overlapping relation thereto.

2. The fluid energy dissipation means of claim 1, further characterized by
    (a) said mating parts comprising a series of stacked rigid plates, and
    (b) a plurality of circular holes formed through each of said plates.